United States Patent

Nolf

Patent Number: 5,792,991
Date of Patent: Aug. 11, 1998

[54] ENVIRONMENTAL SEAL

[75] Inventor: Jean-Marie Etienne Nolf, Korbeek-Lo, Belgium

[73] Assignee: N.V. Raychem S.A., Kessel-Lo, Belgium

[21] Appl. No.: 656,205
[22] PCT Filed: Nov. 30, 1994
[86] PCT No.: PCT/GB94/02623
§ 371 Date: May 31, 1996
§ 102(e) Date: May 31, 1996
[87] PCT Pub. No.: WO95/15601
PCT Pub. Date: Jun. 8, 1995

[30] Foreign Application Priority Data

Dec. 1, 1993 [GB] United Kingdom ............... 9324665

[51] Int. Cl.$^6$ ................................................ H02G 15/013
[52] U.S. Cl. ............................ 174/92; 174/93; 174/138 G
[58] Field of Search ................................. 174/92, 93, 138 G; 336/192, 196, 185

[56] References Cited

U.S. PATENT DOCUMENTS

| | | |
|---|---|---|
| 2,740,825 | 4/1956 | Rifenburg ............... 174/23 |
| 3,339,011 | 8/1967 | Ewers, Jr. et al. ....... 174/92 |
| 4,245,970 | 1/1981 | St. Onge ................. 425/13 |
| 4,332,975 | 6/1982 | Dienes .................... 174/93 |
| 5,247,974 | 9/1993 | Sargent et al. .......... 285/97 |

FOREIGN PATENT DOCUMENTS

| | | |
|---|---|---|
| A0 289 981 | 11/1988 | European Pat. Off. . |
| A92 19034 | 10/1992 | WIPO . |
| A93 03302 | 2/1993 | WIPO . |

*Primary Examiner*—Kristine L. Kincaid
*Assistant Examiner*—Marc D. Machtinger
*Attorney, Agent, or Firm*—Herbert G. Burkard

[57] ABSTRACT

A device for forming an environmental seal around an object includes:

(a) a split housing having a chamber that can surround the object;
(b) an inflatable bladder for inflating around the object and within the chamber;

the housing having a window breaking through its split so that the bladder seals to a seal outside the chamber.

12 Claims, 5 Drawing Sheets

ENVIRONMENTAL SEAL

BACKGROUND OF THE INVENTION

The present invention relates to the formation of an environmental seal around objects such as telecommunications and other cables.

Splicing of cables requires removal of cable jackets in order to expose the underlying conductors for connection. Once the conductors have been connected some sort of seal must be built up across the splice, effectively replacing the removed jacket, in order to protect the otherwise exposed conductors from the environment. The resulting seal, known as a splice case, should have a life-time comparable to that of the cables themselves, commonly 20 or so years. In addition to protecting the conductors from moisture and other environmental contaminants, the splice case must provide some mechanical protection, such as axial pull strength, so that any stresses on the cables are not taken up by the conductor connections. Some cables are pressurized in order to prevent ingress of moisture or to provide a means for detecting and locating leaks, and splice cases joining such cables must, in general, be resistant to pressure-induced creep over their desired life-time. Splice cases must often be installed under unfavourable outdoor conditions and installation must therefore be simple and quick.

It can be seen from these requirements that design of a splice case is not a trivial matter. In recent years heat-shrinkable sleeves, internally coated with a hot melt adhesive, have become widely used for protecting cable splices. They are quick and easy to install and provide the desired environmental and mechanical protection. However, they generally require the use of an open-flame torch for installation which is discouraged in some locations and prohibited in others.

Alternative techniques for forming a seal around cables are disclosed in WO 92/19034 (Raychem), the disclosure of which is incorporated herein by reference. That patent application discloses a flexible hollow sealing member, or bladder, that can be inflated to seal the gap between first and second articles, such as a cable and a duct or splice case housing, and that has a hole directly through a wall or between walls thereof through which hole a tube can be inserted to introduce a pressurizing gas. When the tube is removed the hole is automatically sealed by an internal gel-coated flap. The bladder may be wrapped around the cable to be sealed and then slid along the cable into the duct or splice case housing, and then inflated.

Surprisingly, this technique has been found to be suitable for forming seals having the desired life-time. A difficulty can however arise where the housing, be it a duct or a splice case, is of the so-called wraparound type. This term is well known in the art and means simply that the housing can be installed around an intermediate portion of the cable without access to a free end of the cable. Such a housing will therefore be split, and may comprise two or more "half" shells. The problem arises because the split between the parts of the housing must be sealed if it is not to provide a leak path into the resulting splice case.

Such a split housing may comprise a split or wraparound sleeve that is supported at its ends by disc-shaped end plates. A seal must therefore be made circumferentially around each end plate to the overlying sleeve and also along the longitudinal split in the sleeve. Where these two seals meet is called a triple point and the problem of sealing it has been addressed in U.S. Pat. No. 4,845,314 (Siemens). That patent discloses a cable seal with a wraparound sleeve engaging a pair of split end plates having a sealing system including ring seals on the end plates and a longitudinal sealing element for the slit in the wraparound sleeve. The longitudinal edges of the sleeve have a groove receiving the seal with an inner wall of the groove in the region of the ring seals having a lateral opening or window through which a portion of the longitudinal sealing member can extend to contact the ring seals. Note, however, that no discussion is made of any seal between the ring seals and the underlying split end plates.

SUMMARY OF THE INVENTION

We have now discovered that a split housing accommodating an inflatable bladder can be designed in such a way that the split is sealed.

Thus, the present invention provides a device for forming an environmental seal around an object such as a cable, which comprises:

(a) a split housing having a chamber that can surround the object;

(b) an inflatable bladder that can be inflated around the object and within the chamber;

the housing having a window breaking through its split such that the bladder can seal to a seal outside the chamber.

The bladder may be of any suitable shape or design but is preferably substantially as described in WO92/19034, and in particular preferably has a sealing material such as a gel overlain by a flap on an internal surface of a wall thereof for self-sealing of a hole through the wall after inflation of the bladder. Inflation may be carried out by inserting a tube through the wall of the bladder either before or after the bladder has been positioned within the housing.

Where the device is for forming a branched cable splice, the housing will have means for accommodating two or more cables substantially side-by-side. This may be done by providing two or more chambers and an inflatable bladder for each. The window may then break through a wall of the housing from one chamber to the other such that the two bladders can seal to one another. The seal between the bladders may of course be via some further sealing member, such as a coating or layer provided on one or both bladders.

Additionally or alternatively the window may allow the or each bladder to form a seal to a casing that surrounds the housing. In this case the window may break through to an external surface of the housing. Here, the housing may serve as an end part to a splice case, providing a seal to incoming cables. The splice itself may then be housed in the casing which may be a sleeve that extends away from the housing. In the case of a butt splice case one housing will be provided and the casing will comprise a blind or dome-shaped, tube. Alternatively, an in-line splice case may be provided in which case a housing will be provided at each end of a casing. In general, the casing will comprise a sleeve, an end portion of which overlaps and is supported by the housing.

A seal may be made directly between the casing and the housing that it overlaps, but in some cases it may be preferred to provide some additional seal between them such as an O-ring or other circular seal. Such a circular seal will generally be truly circular (since the housing around which it is to seal will generally be truly circular), but it can have other shapes and by "circular" we simply mean that in use the seal forms a closed loop. The seal may, however, be supplied in "wraparound" form and therefore comprise a length of sealing material whose ends can be brought together. The seal is preferably an O-ring of oval or substantially truly circular cross-section. Where a circular seal is to be used the housing may be provided with a seal for it around its periphery. Such a seal may serve to retain the seal in its desired location and may comprise a circumferentially-extending recess having a depth less than the thickness of the seal in order that the seal protrude above it for contact with an overlying casing. The window will then in general break through to the base of the seal for the circular seal in order that the circular seal can form a seal between the casing and the bladder.

The casing may comprise a wraparound sleeve having a sealing material sealing along a longitudinal split thereof, and having its own window that breaks through its split to an internal surface of the sleeve to make a seal to the circular seal. Thus a wraparound sleeve of the type disclosed in U.S. Pat. No. 4,845,314 may be used.

The device of the invention may be provided with a clamp for mechanically attaching the cable or other object to the housing. Such a clamp may provide axial pull strength or other reinforcement.

BRIEF DESCRIPTION OF THE DRAWINGS

The present invention is further illustrated with reference to the accompanying drawings, in which.

DESCRIPTION OF THE PREFERRED EMBODIMENTS

Figure 1A:
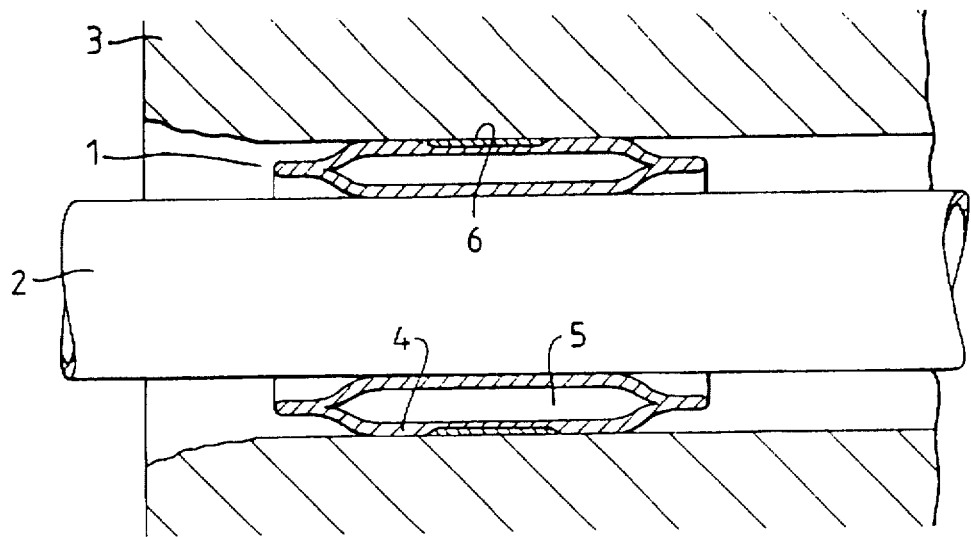
FIGS. 1A and 1B show prior art use of an inflatable bladder.
Figure 1B:
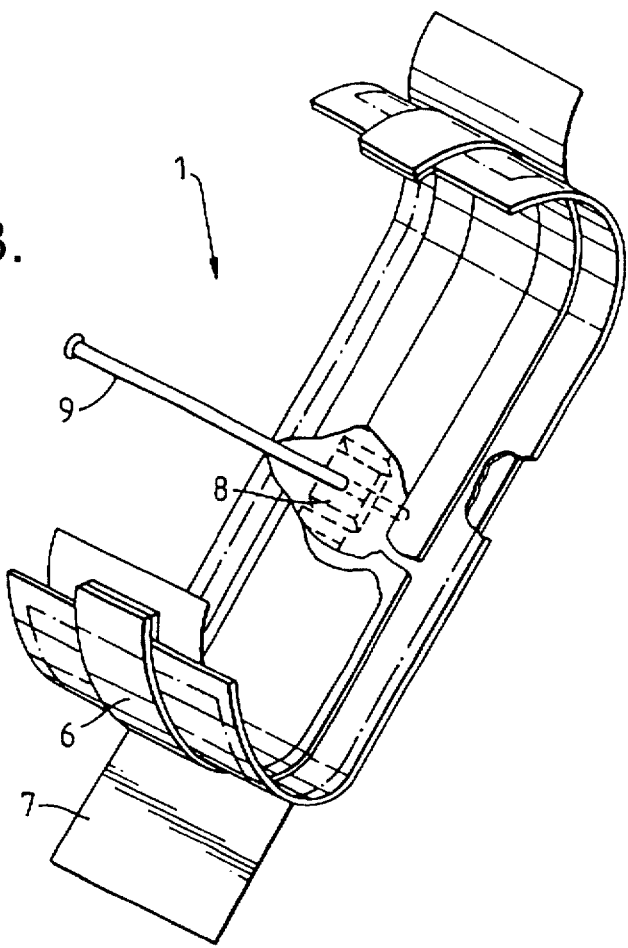

FIGS. 1A and 1B show inflatable bladders as disclosed in WO92/19034. In FIG. 1 an inflatable bladder 1 is shown as a duct seal, sealing an annular gap between a cable 2 and a duct 3. The bladder could however be used inside a casing in order to form a splice case. The bladder 1 has flexible and preferably substantially non-stretchable, walls 4 between which a pressurizing fluid such as air is introduced. An outer surface of the walls 4 may be provided with a sealing material 6, such as a mastic, to fill irregularities in the surface of the duct or outer casing. The bladder 1 is shown in more detail in FIG. 1B, where a relief layer or thin film 7 is provided over the mastic 6, either in order to protect it before use or to provide a lower friction surface to facilitate installation of the bladder. The bladder has a sealing gel 8 overlain by a flap on an internal wall for self-sealing a hole through the wall after inflation of the bladder and removal of an inflating tube 9.

Figure 2A:
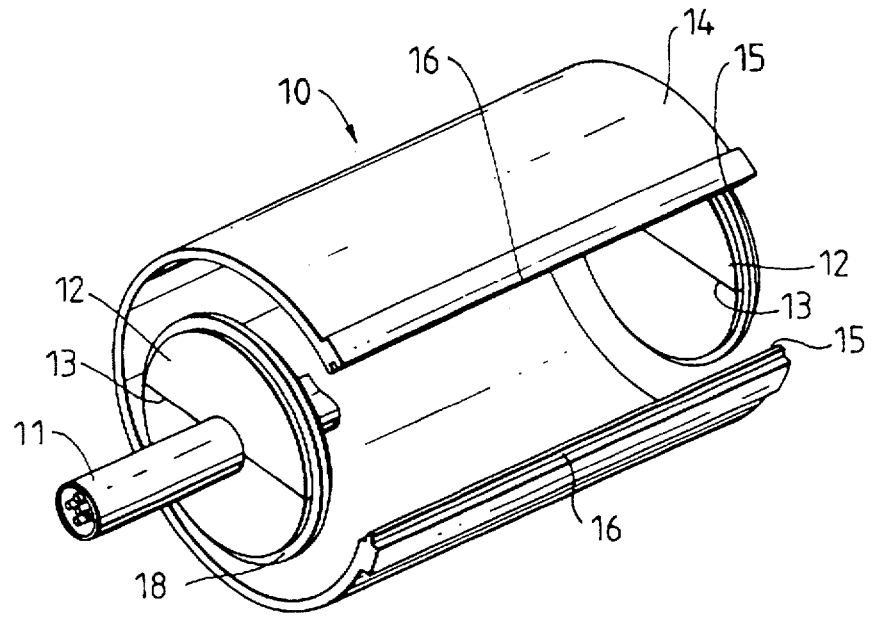
FIGS. 2A and 2B show a prior art solution to the triple point problem.
Figure 2B:
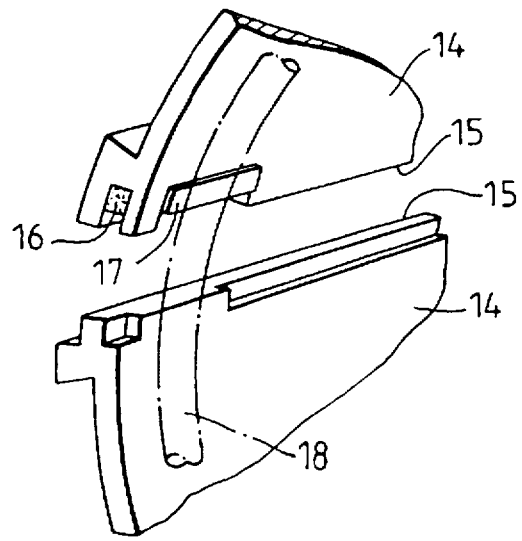

A solution to the triple point problem as disclosed in U.S. Pat. No. 4,845,314 is illustrated in FIGS. 2A and 2B. A splice case 10 is formed around a cable 11 (partially drawn) and comprises split end plates 12, the split 13 allowing the plates to be "wrapped around" the cables. A wraparound casing 14 is then installed around the end plates and the longitudinal edges 15 fastened together. A longitudinal seal 16 provides a seal between edges 15. The sleeve 14 can be seen in FIG. 2B to have a window 17 breaking through its internal surface such that longitudinal seal 16 is able to contact an O-ring 18 that surrounds each end plate 12.

Figure 3:
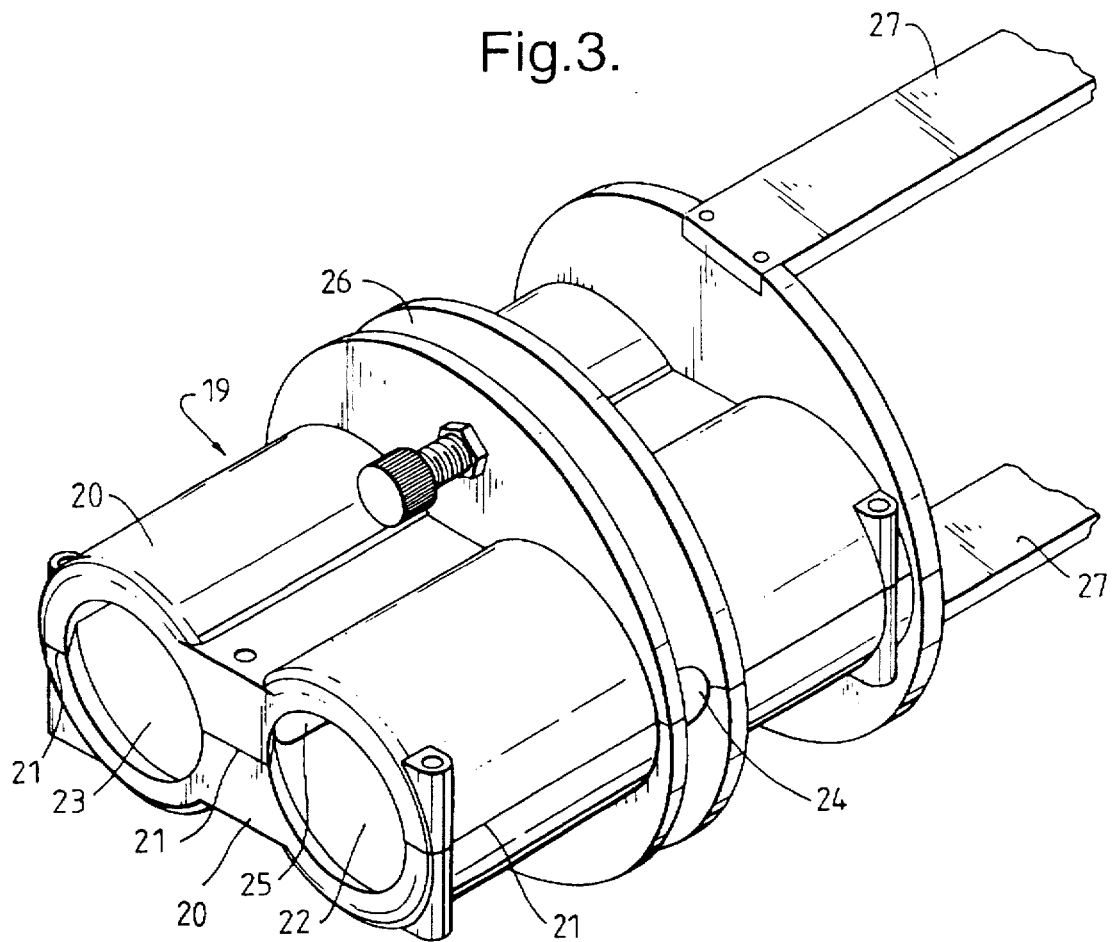
FIG. 3 shows a housing as used in the invention.

A housing 19 as used in the invention is shown in FIG. 3. The housing comprises parts 20 that abut one another at a split plane 21. The housing shown in FIG. 3 is designed to form an outlet for a splice case: the cables enter the splice case through the two inlets shown at the left-hand side of the figure, and the splice itself is sealed at a position to the right of the figure and within a casing (not shown) that extends from a mid point of the casing to the right as drawn.

The casing shown in FIG. 3 is for sealing two ingoing cables, and as a result has first and second chambers 22 and 23 into which inflatable bladders can be positioned as shown in FIG. 1A. The housing 19 has a window 24 which breaks through to an external surface of the housing such that a bladder within the chamber 22 can contact a casing surrounding the housing. Two such windows 24 may be provided at the split plane 21, one at each side of the housing. A further window 25 is also shown which breaks through from one chamber to the other, again at the split plane 21. This window 25 allows a bladder in chamber 22 to seal to a bladder in chamber 23.

The thickness of the wall of the housing that defines each window has preferably substantially zero thickness at the window. The wall need not of course terminate as a sharp edge and it may be slightly rounded, but there is preferably no significant flat surface extending perpendicularly to the surface of the installed bladder at the window. This tapering or other shaping of the wall of the housing at the window will facilitate a seal being made between two adjacent bladders or between a bladder and some other sealing member.

The window 24 breaks into the base of a seat 26 for a circular seal. The seat 26 preferably comprises a circumferentially-extending recess which can locate a circular seal around the periphery of the housing and which has a depth less than the thickness of the seal so that the seal protrudes above it. In this way, a casing surrounding the housing 19 will contact the circular seal. Where a splice case is to be constructed comprising two housings 19 bridged by a central casing, the two housings 19 may be mechanically interconnected by one or more tie bars 27. Also, a clamp may be provided for mechanically attaching to the housing 19 the cables that enter the cavities 22 and 23. Any axial stress on the cables will therefore be transmitted via such clamps to the housing and then from one housing to the opposite housing via tie bars 27. As a result, connectors interconnecting conductors of the cables will not be stressed.

Figure 4:
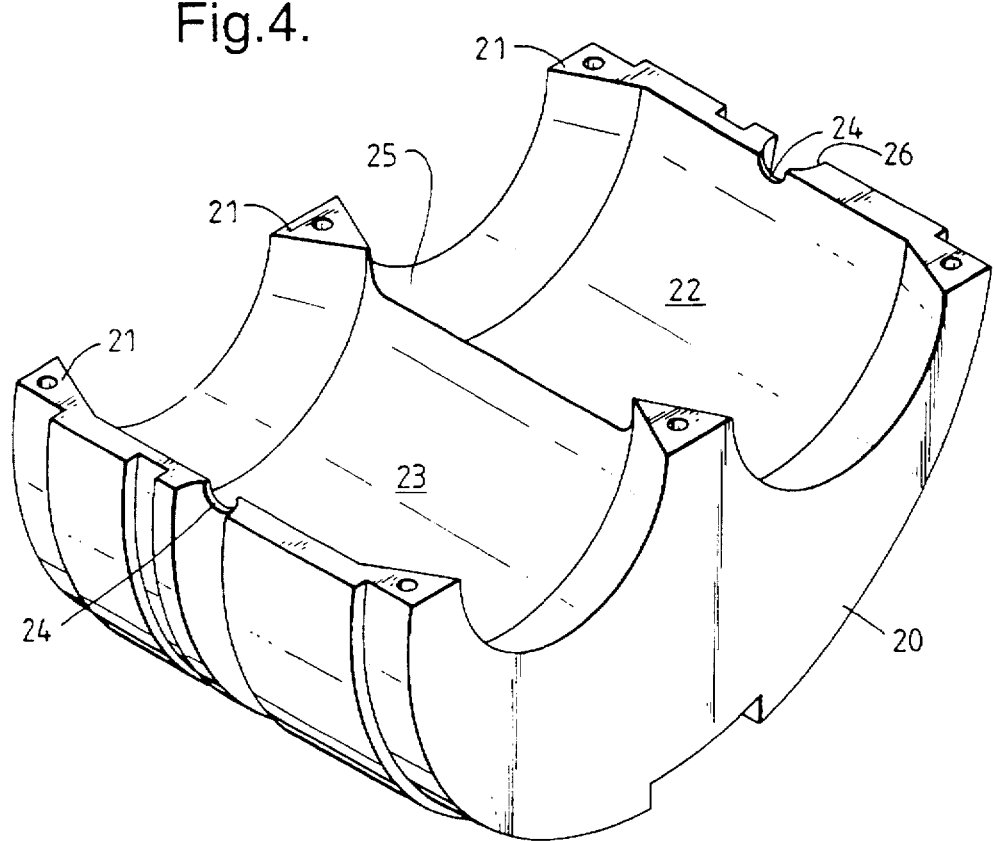
FIG. 4 shows a part of housing.

FIG. 4 shows in greater detail a housing part 20 of slightly different design to that of FIG. 3. Windows 24 and 25 can be seen breaking through from the chambers 22, 23 to an external surface of the housing part and also from one chamber to the other. The walls of a housing part can be seen to taper to substantially zero thickness at the windows.

Figure 5:
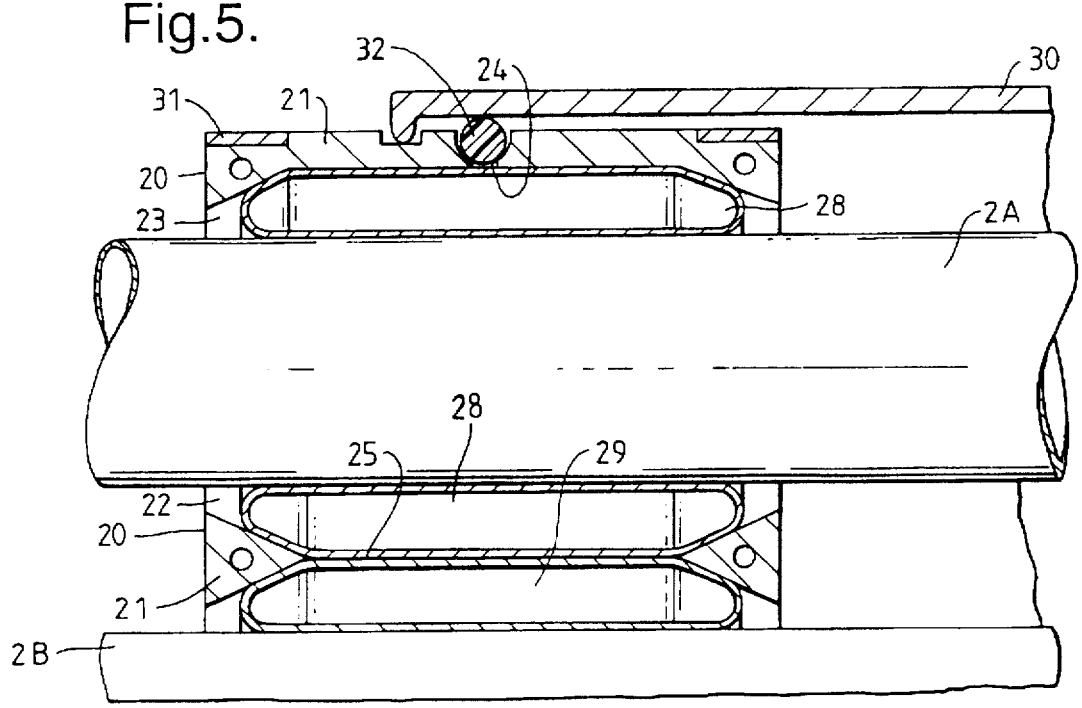
FIG. 5 shows an inflatable bladder installed in a housing.

FIG. 5 is a partial plan view of the housing part of FIG. 4 shown with a cable 2A and bladder 28 in chamber 23 and with a cable 2B and bladder 29 in chamber 22. Also shown is a part of a casing 30 surrounding the housing and being sealed to it by means of an O-ring 32 which makes a seal through window 24 to bladder 28. Bladders 28 and 29 can be seen to be sealed to one another through window 25. Circular bands 31 surround the housing parts to hold them together.

Figure 6A:
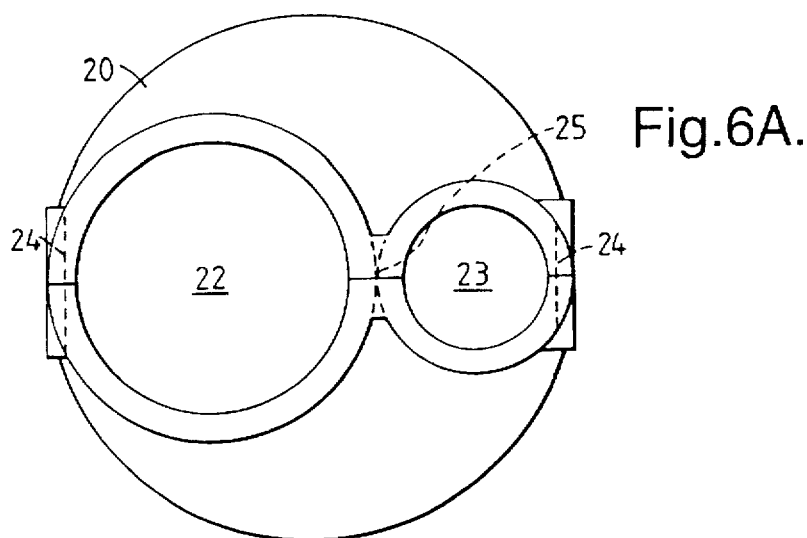
FIGS. 6A 6B and 6C show housings for sealing various cable configurations.
Figure 6B:
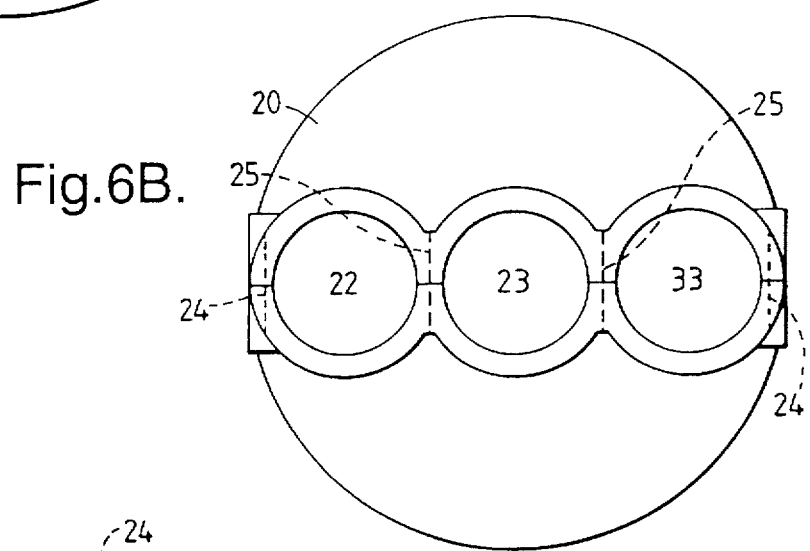
Figure 6C:
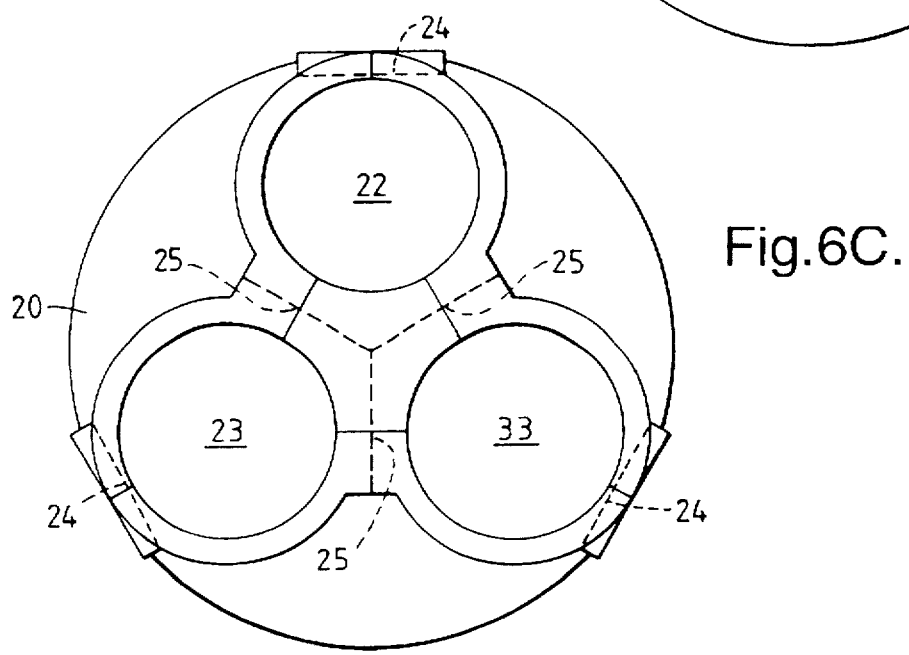

FIGS. 6A, 6B and 6C show in end views various designs of housing. In FIG. 6A two chambers are provided with first windows 24 breaking into an external surface of the housing and with a second window 25 breaking from one chamber to the other. In FIG. 6B three chambers 22, 23 and 33 are shown side-by-side. In FIG. 6C three chambers 22, 23 and 33 are arranged at the corners of a triangle. This arrangement allows chambers to be provided that are larger than that allowed by the arrangement of FIG. 6A but it has the disadvantage that the housing is formed of three rather than two parts. Nonetheless, the various splits between the parts of the housing can still be sealed by providing appropriate windows 25.

I claim:

1. A device for forming an environmental seal around an object, which comprises:

(a) a split housing having a chamber that can surround the object;

(b) an inflatable bladder for inflating around the object and within the chamber;

the housing having a window breaking through its split so that the bladder, when inflated, protrudes through the window and seals to a seal outside the chamber.

2. A device according to claim 1, in which the housing further includes a second chambers, in which the inflatable bladder comprises a first inflatable bladder, and in which the device further comprises a second inflatable bladder and the window breaking through from one chamber to the other such that the first and second inflatable bladders, when inflated, seal to one another.

3. A device according to claim 1, in which the window breaks through to an external surface of the housing such that the bladder can seal to a casing that surrounds the housing.

4. A device according to claim 3, in which the window breaks through to a seat that surrounds the housing.

5. A device according to claim 2, in which second and third windows break through to external surfaces of the housing such that each of said bladders can seal through respectively the second and third windows to a casing that surrounds the housing.

6. A device according claim 1, in which the bladder has a sealing material overlain by a flap on an internal surface of a wall thereof for self-sealing a hole through the wall after inflation of the bladder.

7. A device according to claim 1, having a clamp for mechanically attaching the object to the housing.

8. An assembly comprising an environmental seal device for forming an environmental seal around an object, the device including a split housing having a chamber for surrounding the object and an inflatable bladder for inflating around the object and within the chamber, the split housing having a window breaking through its split so that the bladder, when inflated, protrudes through the window and seals to a seal outside the chamber; and a casing substantially surrounding the housing.

9. An assembly according to claim 8, in which the casing comprises a sleeve, an end portion of which overlaps and is supported by the housing.

10. An assembly according to claim 9, in which the window breaks through to a seat that surrounds the housing to form the seal between the bladder and the seal.

11. An assembly according to claim 10, in which the sleeve is a wrap-around sleeve, having a sealing material sealing along a longitudinal split thereof, and having a sleeve window that breaks through the split of the sleeve to an internal surface of the sleeve.

12. A housing for forming a device or assembly according to any of claims 1-11.

* * * * *